Feb. 13, 1951　　　　F. C. WILLIAMS　　　　2,541,627
WIRELESS SIGNALING SYSTEM
Filed July 25, 1947　　　　　　　　　　　　3 Sheets-Sheet 1

Inventor
F. C. Williams
By
Attorney

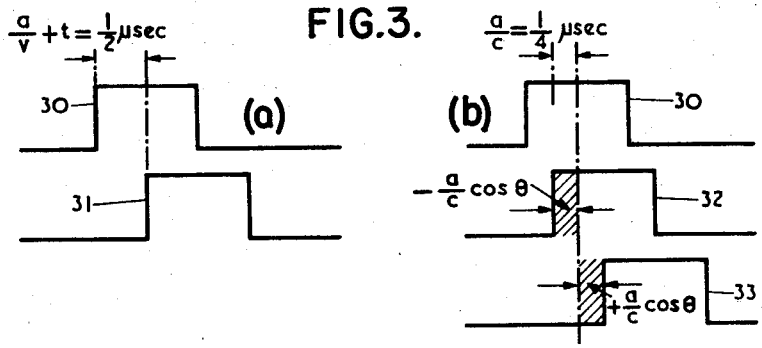
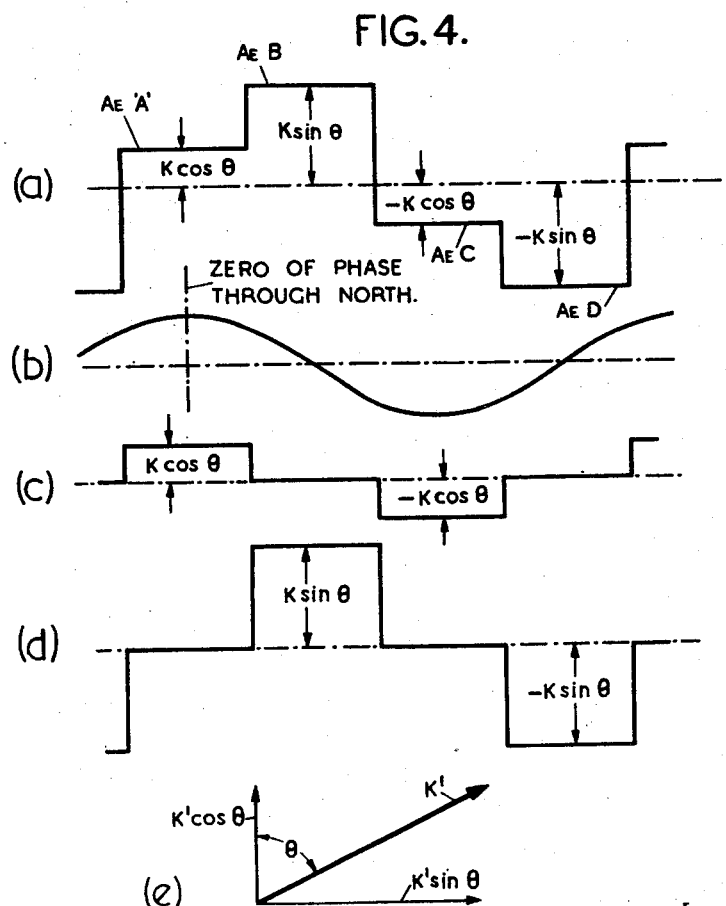

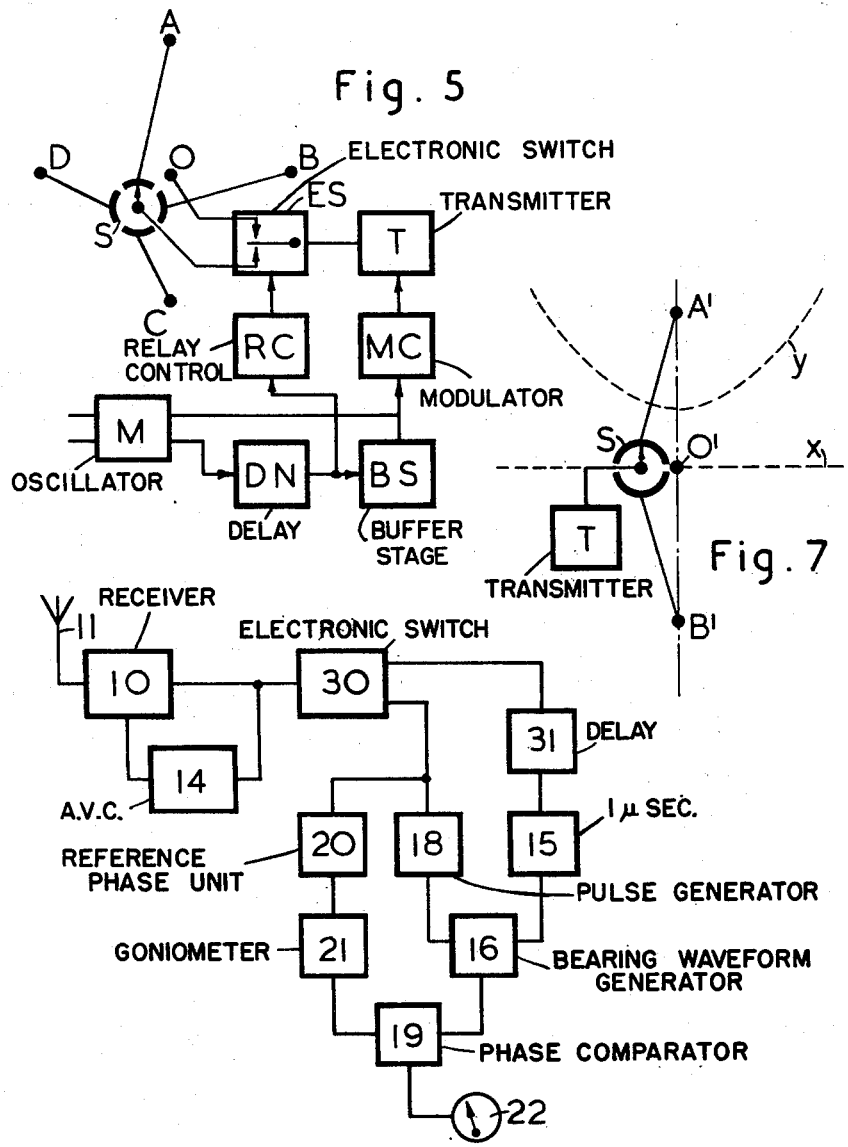

Patented Feb. 13, 1951

2,541,627

UNITED STATES PATENT OFFICE 2,541,627

WIRELESS SIGNALING SYSTEM

Frederic Calland Williams, Timperley, England

Application July 25, 1947, Serial No. 763,712
In Great Britain May 24, 1945

Section 1, Public Law 690, August 8, 1946
Patent expires May 24, 1965

21 Claims. (Cl. 343—105)

This invention relates to wireless signalling systems and is more particularly concerned with arrangements for aiding the navigation of mobile craft such as a seaborne ship or an aircraft.

The object of the invention is to provide improved arrangements by which the navigator of such a mobile craft may obtain useful information regarding his bearing with respect to a known geographical position and, with certain and preferred embodiments thereof, may also be provided with an indication of the amount and direction of deviation with respect to a chosen course line towards or away from such known position.

The scope of the invention is defined in the appended claims. In the preferred embodiment of it, information is provided in a mobile craft as to its bearing direction with respect to a known geographical position by the comparison of the phase relationship of a first alternating current or voltage derived from the reception of pulse signals radiated repeatedly in cyclic order from each of a plurality of aerials spaced about the known position with respect to a second or reference alternating current or voltage whose frequency is the same as that of the cyclic repetition of the ground transmissions and whose phase is related to the cyclic order timing of the radiations from each of said spaced aerials.

The first alternating current or voltage is derived from the cyclic variation of the transit time required for signals to reach the mobile craft from each of the fixed aerials in turn due to their spacing.

The second reference alternating voltage or current is conveniently provided by the transmission of a suitably modulated signal from a further aerial located at the centre of said spaced aerials. This modulated signal may comprise a series of pulse signals at the same recurrence frequency as those from the spaced aerials and occurring at a fixed timing relationship therewith, said further pulse signals being width-modulated in synchronism with the cyclic order of transmission from said spaced aerials.

In a convenient constructional arrangement four spaced aerials are provided located one at each corner of a square and fed in turn with groups of pulses from one transmitter through a rotary switch. A further aerial located at the centre of the square is fed with pulses from a second transmitter, said pulses being width modulated in sinusoidal fashion in synchronism with the rotation of the switch controlling the supply of pulses to said spaced aerials.

In order that the above and further features of the invention may be more readily understood embodiments thereof will now be described, by way of example only, with reference to the accompanying drawings in which:

Figure 2 is a block schematic diagram of the apparatus provided in the mobile craft for use in conjunction with the ground station of Fig. 1, while Figures 3 and 4 are waveform diagrams illustrating the operation of the arrangement shown in Figure 2.

Figure 5 illustrates in block schematic form one modified form of ground beacon transmitter while Figure 6 shows an appropriately modified mobile craft arrangement adapted for use with the beacon of Figure 5, Figure 7 is a schematic block diagram of a simplified beacon arrangement.

Figure 1:
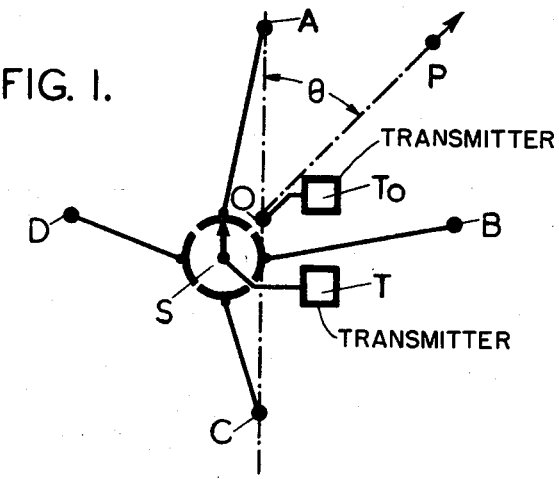
Figure 1 is a diagram showing the layout of a fixed ground or beacon transmitting station constructed in accordance with the invention.

Referring to Figure 1, T and T₀ indicate two pulse transmitters operating respectively on different frequencies $f$ and $f_0$ of the order of, say 200 mc/s. It will be assumed for convenience of description that the transmitters are both located at O in the centre of the square A, B, C, D, and that the line AC lies in the north-south direction although such a lay-out is not essential to the successful operation of the arrangement.

Transmitter T is modulated at a pulse-recurrence frequency of, say, 5 kc/s. and its output is supplied by way of a four-quadrant switch S, also located at the point O, to one or other of four aerials located respectively at the corners A, B, C and D of the square. The switch S is rotated 50 times per second so that, assuming perfect switching, each aerial at A, B, C or D will radiate groups of 25 pulses in turn, such groups being recurrent at 50 C. P. S.

Transmitter T₀ is also modulated at the same pulse recurrence frequency, e. g., 5 kc/s., as transmitter T and its output is supplied continuously to an aerial located at the centre point O. The pulses from this transmitter T₀ are width-modulated in synchronism with the rotation of the switch S, i. e., at 50 C. P. S., a predetermined point e. g., that of maximum pulse width, of each width-modulation cycle coinciding with a chosen instant in the rotation cycle of the switch S, e. g., the instant which marks the middle of the group of pulses sent to the north aerial A. This width-modulation is employed to provide the necessary reference waveform at the mobile craft.

It will be assumed initially that the pulses supplied by transmitter T₀ occur in exact synchronism with those supplied by transmitter T but, as will become apparent later, this is not essential and in some circumstances a certain predetermined delay may require to be introduced between each pulse from transmitter T₀ and the corresponding pulse from transmitter T.

If now a mobile craft, such as an aircraft, be regarded as located at a point P so distant from O that lines joining O, A, B, C and D to P may be considered to be parallel, then certain simple relations will exist for the time-difference which will occur between the reception at the mobile craft of a pulse radiated from aerial O and the corresponding pulse radiated from one of the aerials A, B, C, or D.

For instance, if the distance via a direct transmission line from transmitter T at point O to any one of the aerials at A, B, C or D=$a$ and a pulse has a velocity $v$ in such transmission line then the time difference $tA$ for the aerial A (i. e., time via aerial A— time direct from aerial O), will equal $$\frac{a}{v} - \frac{a \cos \theta}{c}$$

where $c$ is the velocity of e. m. waves in air and $\theta$ is the bearing angle of the point P with reference to the line through A and C i. e., due north. Similarly if $tB$, $tC$ and $tD$ are the time differences for aerials B, C and D then $$tB = \frac{a}{v} - \frac{a \sin \theta}{c}$$

$$tC = \frac{a}{v} + \frac{a \cos \theta}{c}$$

$$tD = \frac{a}{v} + \frac{a \sin \theta}{c}$$

Figure 2:
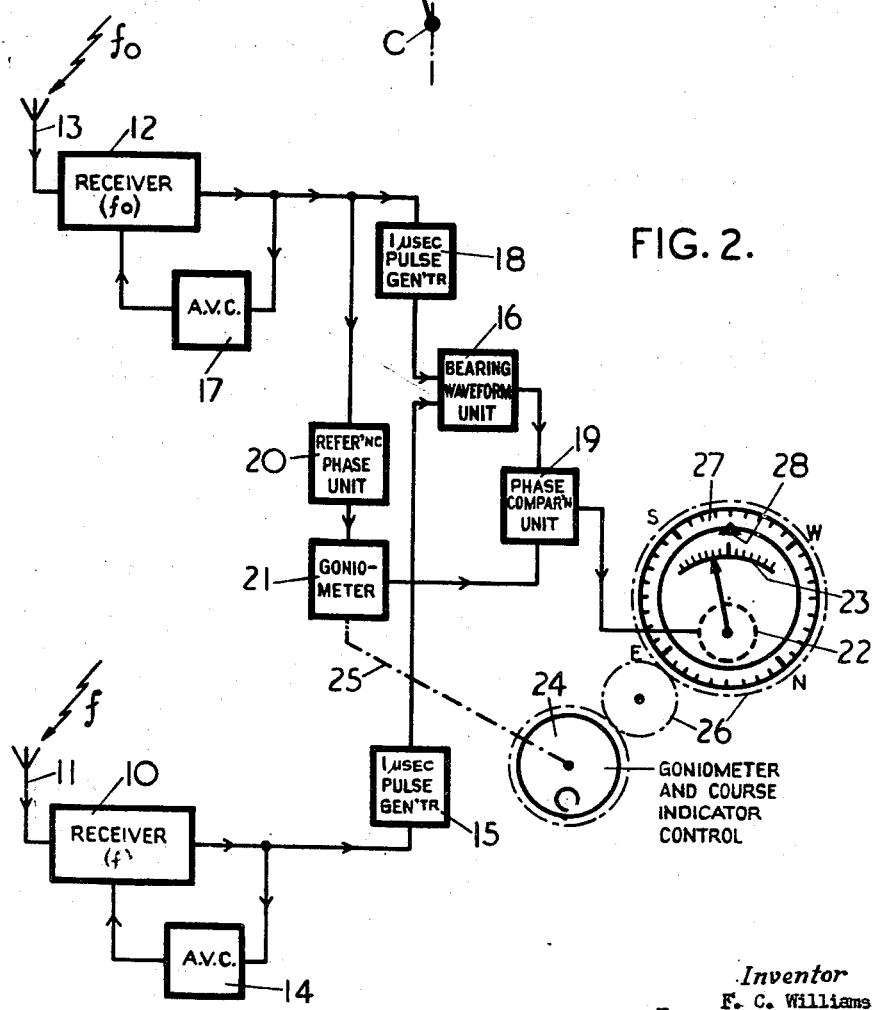

Referring now to Figure 2, which illustrates in block schematic form the apparatus arrangement in the mobile craft, a first receiver 10 connected to aerial 11 and tuned to frequency $f$ of transmitter T provides a pulse waveform output from the pulse signals received from the corner aerials A, B, C and D. A second and similar receiver 12 connected to aerial 13 and tuned to frequency $f_0$ of transmitter T₀ provides a pulse waveform output from the pulse signals received from the centre aerial O.

The pulse waveform output from receiver 10, in addition to operating an A. V. C. system 14 for the receiver 10, is also applied to a pulse generating unit 15 which provides a 1 micro-second pulse commencing in coincidence with the leading edge of each received pulse. This 1 micro-second pulse waveform output is applied to a bearing waveform unit 16 whose function and construction will be dealt with later.

The output waveform from receiver 12 is similarly used to operate an A. V. C. system 17 for the receiver 12 and to control a second pulse generating unit 18 which provides 1 micro-second pulses, each commencing in coincidence with the leading edge of each pulse received from the centre aerial O. This 1 micro-second pulse waveform is also applied to the bearing waveform unit 16.

By suitable choice of value for the distance $a$ previously referred to between transmitter T and each of the aerials A, B, C, D, the above described 1 micro-second pulses may be made to overlap one another within the unit 16, the degree of overlap, being variable in accordance with change in the aforesaid time-difference factor. In view of the possible positive or negative value of the sine or cosine term in the time-difference expressions previously evolved it is desirable so to arrange the overlap that, when no sine or cosine term is present (i. e., when $\theta$ equals either 0°, 90°, 180° or 270°), it is 0.5 micro-second and for this purpose an artificial delay $t$ may be introduced at the transmitter T to make this overlap time i. e., $$\frac{a}{v} + t = 0.5 \text{ micro-second}$$

The maximum time-difference change due to the sine or cosine terms is $a/c$ and this is made equal to 0.25 micro-second thereby leaving 0.25 micro-second of overlap as tolerance at either end of the range of overlap variation. With such choice of values the dimension $a$ becomes approximately 250 feet.

Figure 3(a) illustrates at 30, a 1 micro-second pulse derived from a pulse signal from centre aerial O and at 31 a similar 1 micro-second pulse derived from the corresponding signal from a corner aerial when $\theta$ is such that the sine or cosine term of the previously quoted expressions disappears and when $$\frac{a}{v} + t = 0.5 \text{ micro-second}$$

It will be seen that the leading edge of the corner aerial pulse is coincident in time with the midpoint of the centre aerial pulse. This condition may be defined as the "zero or mean condition of overlap" so that the sine or cosine terms when present introduce positive or negative outputs according to whether the degree of overlap increases or decreases.

Figure 3(b) illustrates a typical overlap condition when $\theta$ is such that a sine or cosine term is present. 30 indicates the centre aerial pulse as before while 32 and 33 indicate the corresponding pulses from aerials at opposite corners e. g., A and C. The shaded portions illustrate the respective positive and negative overlaps about the above defined "zero or mean condition" and are determined by the terms $$-\frac{a \cos \theta}{c}$$

and $$+\frac{a \cos \theta}{c}$$

Considering for the moment one corner aerial alone, e. g., the aerial at A, it will be recalled that groups of 25 pulses are radiated therefrom 50 times per second. By the application of these, together with the corresponding pulses from the centre aerial O, to a suitable valve circuit, e. g., a "gate" valve arrangement, in the bearing waveform unit 16 (Figure 2) it is possible to derive, after suitable smoothing a steady anode current in a valve which is proportional to cos $\theta$. If K is a constant of proportionality, $K \cos \theta$ may be said to represent the anode current for aerial A. Similarly for aerials B, C and D the anode current for the same valve will be, $K \sin \theta$, $-K \cos \theta$ and $-K \sin \theta$ giving an anode current waveform as shown in Figure 4(a). This waveform, of course, repeats itself at 50 C. P. S., and its shape is a function of $\theta$, i. e., is dependent upon the bearing of the mobile craft with respect to the point O of the fixed ground beacon.

The fundamental component of this waveform can be shown to lag by the angle $\theta$ on the reference sine wave of diagram Figure 4(b) which is obtained by suitable demodulation of the width-modulated pulses received from transmitter $T_0$.

The anode current waveform of Figure 4(a) may be resolved into two component waveforms as shown in Figure 4(c) and (d) due respectively to the signals from aerials A, C and B, D. Their fundamental components will be proportional to $\cos \theta$ and $\sin \theta$ respectively, the former leading the latter by 90°. If the constant of proportionality equals $K^1$ then, as shown in Figure 4(e) the fundamental component of the waveform of Figure 4(a), i. e., that of the component waveforms of Figure 4(c) and 4(d) added together, lags behind the component $K^1 \cos \theta$ by the angle $\theta$. The component $K^1 \cos \theta$ however is, by definition, in phase with the reference waveform of Figure 4(b) and the latter therefore leads by O on the said fundamental component of the bearing waveform.

It will be appreciated that the bearing of the beacon from the aircraft, which is what is required, is not O but $-(\pi-\theta)$ (with the convention that angles east of north are positive and angles west of north are negative); this may readily be provided for by utilising, instead of the current waveform shown in Figure 4(a) the corresponding voltage waveform produced across a resistance in the anode circuit of the valve concerned.

Returning now to Figure 2, the resolved bearing waveform provided by the unit 16 is applied to a phase comparison unit 19. This unit is also supplied with the reference waveform of Figure 4(b) derived, as already stated, from the width-modulated pulse signal output of receiver 12 through a reference phase unit 20 which serves to smooth the receiver output wave-form to one of sinusoidal form, and a goniometer or phase shifting device 21 by which any desired degree of phase-shift may be imparted to this reference waveform before its application to unit 19 for phase comparison with the output from unit 16.

If the goniometer unit 21 is adjusted to impart a phase-shift $\phi$ equal to the angle $\theta$ the phase comparison unit 19 provides an output which causes a centre-zero meter 22 to read zero on its associated scale 23. Any deviation of the angle $\theta$ between the bearing and reference waveform will cause the meter 22 to swing to the left or right according to whether such deviation is one of lead or lag.

The goniometer unit 21 is adjusted by means of a control knob 24 through a suitable linkage indicated diagrammatically at 25. The setting value of the goniometer unit is indicated, in terms of bearing angle $-(\pi-\theta)$ by the inter-connection of knob 24 through a gear train 26 with a rotatable ring 27 carrying a calibration in degrees cooperating with a fixed index mark 28.

By suitable calibration the meter 22 may be arranged to give a direct indication in degrees of any off-course deviation. The rotatable scale ring 27 conveniently surrounds the off-course meter as shown.

The various elements of both the ground beacon transmitting arrangement shown in Figure 1 and the mobile craft apparatus shown in Figure 2 may be of any suitable and well known form. For example the transmitters T and $T_0$ with their modulating arrangements may follow the constructions now well known in connection with radar and like pulse modulated equipment. The various aerials should, of course, be of the omni-directional type. The rotating switch may be of rotating brush form or alternatively of the rotating capacity type not making direct metallic contact between its stationary and moving members. In the mobile craft apparatus the receivers 10 and 12 may again follow radar practice as may also the pulse generator units 15 and 18. The latter two units may conveniently comprise relaxation oscillator circuits of the so-called "flip-flop" type, triggered to the unstable condition by each received pulse signal and reverting automatically to the stable condition after the chosen time interval of 1 micro-second. The bearing waveform unit 16, as already indicated, makes use of a "gate" valve circuit. This circuit may comprise a multi-electrode valve such as a pentode, normally held with its anode current cut off by the application of suitable blocking potentials to both its control and its suppressor-grids. The 1 micro-second pulse outputs from units 15 and 18 are of such value as separately to be incapable but in combination to be capable of opening up the valve so that, when both occur simultaneously, a set value of anode current flows for the precise period of their simultaneous occurrence or overlap. The unit 20 may comprise a suitable integrating network having a time-constant adapted to the switching frequency while the goniometer unit 21 may comprise a rotating coil or a rotating condenser form of goniometer device, the two opposite input elements of which are each supplied from the unit 20 through a suitable phase-splitting circuit. Several forms of such devices are shown, for example, in Terman's Radio Engineer's Handbook, 1943, at page 949. The phase comparison unit 19 may be of conventional form adapted to provide an output whose magnitude and polarity are functions of the phase-relationship of the two applied input waveforms.

The use of two transmitting and two receiving channels is not essential. One alternative arrangement may comprise one transmitter which supplies pulses as before to the four corner aerials and which is arranged also to supply corresponding width-modulated pulses to the centre aerial after a predetermined delay interval.

Figure 5 illustrates one ground beacon transmitter arrangement suitable for operation according to this modification while Figure 6 shows the appropriately modified mobile craft arrangement. Referring to Figure 5 the single pulse transmitter T supplies its pulse output to either the centre aerial O or the rotary switch S under the control of a switching arrangement ES which may conveniently be of similar form to the spark-gap devices as used for common T and R working in certain forms of radar apparatus. The switching route provided by the device ES is controlled by an electronic relay control circuit RC which is normally stabilised in a condition by which the device ES routes the transmitter output to the rotary switch S but which may be momentarily tripped to an opposite condition by which the device ES routes the transmitter output to the centre aerial O. This momentary tripping is effected by an applied pulse waveform to the circuit RC.

The pulse modulating waveform for controlling the operation of the transmitter T is supplied by a unit M, which may conveniently comprise a stabilised oscillator circuit. This modulating waveform is applied directly to the modulating circuits MC of the transmitter T and also to a delay circuit DN by which a chosen time delay interval is imposed. The delayed pulse output from this circuit DN is then applied as a triggering input to the relay control circuit RC and also, by way of a buffer stage BS, to the modulating circuit MC as a supplementary control input thereto.

In the operation of this beacon arrangement, each pulse of the original modulating waveform causes a first pulse to be generated by the transmitter T and applied by way of the device ES to the switch S and thence to one of the corner aerials A, B, C or D. After a delay interval set by the circuit DN, the same pulse causes the control circuit RC to change the device ES to its opposite condition and simultaneously effects a second pulsing of the transmitter T. This second pulse is radiated by way of the centre aerial O and, of course, carries the requisite width modulation to provide the reference waveform at the mobile craft. The circuit RC and the device ES then revert to their original condition in readiness for the next pulse of the modulating waveform which causes a repetition of events.

In the mobile craft apparatus for this embodiment, shown in Figure 6, a single receiver 19 and its associated aerial 11 is used together with its A. V. C. system 14. The receiver output is applied to an electronic switching circuit 30 by which it may be directed either to a delay circuit 31 and thence to the 1 micro-second pulse generator circuit 15 or to the other 1 micro-second pulse generator circuit 18 and the associated reference phase unit 20. These units 15, 18 and 20 as well as the remaining elements leading to the indicator device are as already described in connection with Figures 2–4.

The switching circuit 30 may comprise a multivibrator type circuit having one stable and one unstable condition, the unstable condition being initiated by an applied input pulse which is arranged to be the first pulse of the related pair of beacon pulses. The unstable condition is designed to have a natural time duration only slightly larger than the delay time between the related pairs of beacon pulses so that the second of the related pair of pulses reverts the multivibrator circuit back to its stable condition.

In operation the second pulse of each related pair reverts the circuit back to its stable condition so that the first pulse of the next related pair of beacon pulses is directed to the delay circuit 31 and thence, as previously described, to units 15 and 16. The first pulse of each related pair triggers the circuit 30 into the unstable condition so that the corresponding second pulse is directed to the units 18 and 20 and thence again as previously described to units 16, 20 and 19. The delay imposed by the circuit 31 is set so as to be precisely equal to that of the unit D of Figure 5 whereby the necessary overlap condition of the related pulses occurring in unit 16 may be obtained for operation in the manner already described in connection with the first embodiment.

The modulation of the transmitter T₀ to provide the reference waveform need not be sinusoidal as described, it may be of pulsed, squarewave or other suitable form. Since such transmission is used purely as a convenient means of providing a reference waveform in the mobile craft, it may in some cases be dispensed with altogether and an oscillator or chronometer, capable of providing a waveform of sufficient frequency stability to remain accurately synchronised with the cyclic radiation from the spaced aerials at the ground beacon, provided in its place. Alternatively the pulses from the transmitter T may be width-modulated to provide the reference waveform. With such latter arrangement the series of pulses provided by the transmission from T₀ for overlap comparison purposes may be replaced by a phase-stable oscillator in the mobile craft, said oscillator being synchronized by the received pulses radiated by the transmitter T.

The use of four corner aerials has been described but three aerials or any number exceeding three symmetrically spaced about the point O may be used.

In a further embodiment illustrated diagrammatically in Figure 7, an arrangement capable of providing a single course or track towards the beacon comprises two spaced "corner" aerials only.

These aerials A' and B' are symmetrically spaced on either side of the centre point O' in a common line. If the two spaced aerials are fed in turn through transmission paths of equal length in similar manner to the system already described the zero-signal course line provided will be at right angles to the line joining the spaced aerials A', B', as shown at $x$. The bearing waveform will be that shown in Figure 4($d$) and as the angle $\theta$ the changes sign the phase of the waveform will reverse and $\theta =$ to O or $\pi$ will define the course. This waveform is fed to a phase-sensitive circuit which operates the centre-reading meter. No goniometer device is necessary.

An extension of this arrangement is to impose an additional delay time on the pulse signals sent to one of the two spaced aerials A' or B'. The track or course line provided will then be a hyperbola such as that shown at $y$ in Figure 7.

A signalling channel from the beacon to the mobile craft e. g., for speech transmission, may be provided by width modulation of the transmitted pulses from transmitter T or T₀ or both. The 5 kcs. pulse-recurrence frequency and the 50 C. P. S. reference modulation frequency may be filtered out without loss of essential speech frequencies.

The use of pulse technique compared with the continuous-wave radiation as used in prior arrangements has the advantage of comparative immunity from fading. Such fading is normally due with C. W. arrangements, to the interaction of waves reaching the mobile craft from the transmitting aerials by the direct path and by one or more paths involving reflection from other objects. Since the one micro-second pulses used in the mobile craft with the present invention to produce the bearing waveform are dependent for their formation on the first 0.25 micro-second, only of the received pulses, reflected pulses which arrive later than 0.25 micro-seconds behind the direct wave pulse will produce no adverse effect. Since 0.25 micro-second is equal approximately to 250 feet of travel of e. m. waves in air, the ground area over which detrimental reflection can take place is very limited.

I claim:

1. In or for a navigation system for the guiding of a mobile craft such as an aircraft, a radio beacon comprising a central aerial sited at the known location of said beacon, at least two other aerials spaced around said central aerial, means for feeding all said aerials with electromagnetic wave energy modulated with timing pulses at the same repetition frequency, together with switching means for feeding said other aerials in a predetermined sequence whereby a continuous train of pairs of related pulses is radiated from the beacon and each related pair consists of a pulse radiated from said central aerial and a pulse radiated from one of said other aerials, the said other aerials being spaced around the central aerial in close proximity so that the time taken for an electromagnetic wave to traverse the distance between said central aerial and any one of said other aerials is such that in a receiver the pulses derived from a related pair of said timing pulses overlap.

2. A radio beacon according to claim 1 wherein four said other aerials are provided equally spaced from said central aerial and located at each corner of a square.

3. A radio beacon according to claim 1 and in which said switching means feed said other aerials in a cyclic sequence for equal periods.

4. In or for a navigation system for the guiding of a mobile craft such as an aircraft, a radio beacon comprising a first transmitter, a central aerial sited at the known location of said beacon and fed from said first transmitter with electromagnetic energy at a first carrier frequency modulated with timing pulses at a constant repetition frequency, a second transmitter, at least two other aerials spaced around said central aerial and fed from said second transmitter with electromagnetic energy at a second carrier frequency modulated with timing pulses at said repetition frequency, together with switching means for feeding said other aerials in a predetermined sequence whereby a continuous train of pairs of related pulses is radiated from the beacon, each related pair consisting of a pulse radiated from said central aerial and a pulse radiated from one of said other aerials, the said other aerials being spaced around the central aerial in close proximity so that the time taken for an electromagnetic wave to traverse the distance between said central aerial and any one of said other aerials is such that in a receiver the pulses derived from a related pair of said timing pulses overlap.

5. A radio beacon according to claim 4 in which four said other aerials are provided equally spaced from said central aerial and located at each corner of a square, said switching means feeds said four other aerials in a cyclic sequence for equal periods and in which means are provided for width modulating the pulses radiating from said central aerial in synchronism with the cyclic sequence of transmission from said other aerials.

6. In or for a navigation system for the guiding of a mobile craft such as an aircraft, a radio beacon comprising a transmitter, a central aerial sited at the known location of said beacon, at least two other aerials spaced around said central aerial, a first switching means whereby said transmitter feeds with electro-magnetic energy modulated with timing pulses at a constant frequency said central aerial and a second switching means for interlacing periods, said second switching means feeding said other aerials in a predetermined sequence so that a continuous train of pairs of related pulses is radiated from the beacon, each related pair consisting of a pulse radiated from said central aerial and a pulse radiated from one of said other aerials, the said other aerials being spaced around the central aerial in close proximity so that the time taken for an electromagnetic wave to traverse the distance between said central aerial and any one of said other aerials is such that in a receiver the pulses derived from a related pair of said timing pulses overlap.

7. A radio beacon according to claim 6 in which four said other aerials are provided equally spaced from said central aerial and located at each corner of a square and in which said second switching means feeds said four other aerials in a cyclic sequence for equal periods.

8. A radio beacon according to claim 7 and comprising modulating means to width-modulate and delay means to impose a predetermined delay on the pulses fed to said central aerial.

9. In or for a navigation system for the guiding of mobile craft such as an aircraft, a radio receiver for use in the mobile craft comprising means for receiving a continuous train of pairs of related pulses, means for deriving for each received pulse a rectangular pulse of a constant width which is sufficient to make the pulses from each related pair overlap, and means for determining the degree of overlap of said related derived pulses.

10. In or for a navigation system for the guiding of a mobile craft such as an aircraft, a radio receiver for use in the mobile craft comprising means for receiving a continuous train of pairs of related timing pulses, each related pair of pulses consisting of a first pulse width modulated at a constant frequency and a second pulse, the interval between each pair of related pulses varying repetitively at the width modulation frequency, means for deriving from each received pulse a rectangular pulse of constant width which is sufficient to make the pulses from each related pair overlap, means for producing output pulses proportional in magnitude to the degree of overlap of said related pulses, means for generating a first alternating current from the width modulation of said first pulses and means for generating a second alternating current in phase with and derived from the magnitude variations of said output pulses, and means for comparing the phase relationship between said first and second alternating currents.

11. In or for a navigation system for the guiding of a mobile craft such as an aircraft, a radio receiver for use in the mobile craft comprising means for receiving a continuous train of pairs of related pulses at the same carrier frequency, the interval between each related pair of pulses varying repetitively at a constant frequency and the first pulse of each pair being width modulated at said constant frequency, delay means applied to the first pulse of each related pulse which reduce the interval between each related pair of pulses, means for deriving from each received pulse a rectangular pulse of constant width, which is sufficient to make each related pair of pulses overlap, means for producing output pulses proportional in magnitude to the degree of overlap of said related derived pulses, means for generating a first alternating current from the width modulation of said first pulses, means for generating a second alternating current in phase with and derived from the magnitude variations of said output pulses, and means for comparing the phase relationship between said first and second alternating currents.

12. In a navigation system, a first antenna at a predetermined location, second and third antennas located adjacent the first one and in different azimuthal directions therefrom, means for applying timing pulses of given repetition frequency to said first antenna, means for applying a complementary timing pulse for each pulse emitted from the first antenna, said last-named means including switching means for applying groups of such complementary pulses to said second and third antennas alternately, and a remote receiver whose position is to be ascertained, said receiver including means for effecting a predetermined delay in the first pulse of each pair of complementary pulses, means responsive to the output of the last-named means for producing reformed complementary pulses, and means included in said receiver for measuring the respective overlaps of the reformed complementary pulses; said antennas being positioned in such close proximity and said pulses having so small an interval therebetween that the reformed complementary pulses will overlap.

13. In a beacon system, a receiver whose position is to be ascertained, a first antenna positioned at a known location, at least three other antennas symmetrically positioned about the first one, means for applying groups of pulses to the first antenna, means for applying complementary groups of pulses to one of the other antennas at a time, a switch to shift the output of the last-named means to each of the said other antennas in given sequence, said beacon system including means to cause signals resulting from complementary pulses to overlap, and said receiver including means to indicate the durations of the respective overlaps.

14. In a navigation system, a first antenna at a predetermined location, second and third antennas located adjacent the first one and in different azimuthal directions therefrom, means for applying a pulse modulated radio frequency wave to the first antenna, means for producing a radio frequency wave having a complementary pulse modulation for each pulse of the first-named wave, said last-named means including switching means for applying the second radio frequency wave to said second and third antennas alternately at a repetition rate slower than the repetition rate of the pulses; and a remote receiver comprising means for demodulating complementary pairs of pulses, pulse generating means for deriving from each demodulated pulse a rectangular pulse of sufficient length to effect overlap of the derived pulses of each pair, and indicating means responsive to the overlap of said derived pulses.

15. In a beacon system, a receiver whose position is to be ascertained, a first antenna positioned at a known location, at least three other antennas symmetrically positioned about the first one, means for applying a radio frequency carrier to the first antenna and including modulating means for modulating said carrier with a series of pulses, means for generating a second radio frequency carrier and including modulating means for producing a complementary pulse for each pulse of the first-named series, means for repeatedly applying the second radio frequency carrier to said other antennas in a predetermined sequence, said beacon system including means to cause signals resulting from complementary pulses to overlap, and said receiver including means for giving indications depending on the overlaps of complementary pulses.

16. In a navigation system, a first antenna at a predetermined location; second, third and fourth antennas located adjacent the first one and in different azimuthal directions therefrom; means for applying a first radio frequency carrier modulated with timing pulses of given repetition rate to said first antenna; means for producing a second radio frequency carrier having a pulse complementary to each pulse of the first radio frequency carrier; said last-named means including switching means for repeatedly shifting the second radio frequency carrier to the second, third and fourth antennas in a particular sequence; signal-producing means associated with the switching means for producing a signal that varies according to the frequency at which the second carrier is shifted; and a remote receiver whose bearing is to be ascertained; said receiver including, a circuit for producing a current which varies according to the last-named signal, means for demodulating the first and second radio frequency carriers and producing a current that varies according to the difference in the time phase relationships of complementary pulses, and a phase-responsive measuring device comparing the phase relationship of said currents.

17. The system defined in claim 16 in which said radio frequency carriers have different radio frequencies, and in which the last-named means of claim 16 is responsive to approximately only the first quarter of a microsecond of a received pulse.

18. The system defined in claim 16 in which said signal producing means constitutes means for width-modulating the pulses of the first radio frequency carrier at the frequency at which the second radio frequency carrier energizes the second antenna, and in which said circuit is tuned to said shift frequency and produces an output current of a frequency corresponding to the shift frequency.

19. An indicating device for use aboard a moving craft in conjunction with that form of navigation system in which there is a first width modulated pulsed carrier on one frequency and a second carrier on another frequency having pulse modulations complementary to those of the first carrier; means for demodulating the first carrier to produce a continuous train of width modulated pulses, means for generating a first alternating current of a frequency corresponding to the frequency of the width modulation of said first pulses, pulse generating means for deriving a rectangular pulse of a first predetermined length from each of said first pulses, means for demodulating the second carrier to produce a continuous train of pulses, pulse generating means for deriving a rectangular pulse of a second predetermined length from each pulse of the last-named train of pulses, said first and second named pulse generating means both including means to elongate said rectangular pulses sufficiently to cause complementary rectangular pulses to overlap in time, means for producing output pulses proportional in magnitude to the degree of overlap of the complementary rectangular pulses, said last-named means including a gate controlled by the outputs of the first and second named pulse generating means for passing current when both of such outputs overlap in time, means responsive to said output pulses for generating a second alternating current in phase with the output pulses, and means for comparing the phase relationship of the first and second alternating currents and giving indications of such relationship.

20. A radio receiver for use in a navigation system of the type wherein two radio frequency carriers are pulsed at the same rate and emanate from known locations with the pulses of the first carrier being width-modulated at a constant frequency comprising in combination, means for receiving and demodulating the first carrier to produce width-modulated pulses, means coupled to the demodulated output of the first-named means to convert the width-modulated pulses into an alternating current of a frequency the same as that of the width-modulation, first pulse producing means for deriving a rectangular pulse of first predetermined length from each of the pulses of said demodulated output, means for demodulating the second carrier to produce a series of pulses, second pulse producing means for deriving a rectangular pulse of second predetermined length from each pulse of the last-named series, said first and second pulse producing means including means for sufficiently elongating said rectangular pulses as to cause overlaps thereof when the two carriers have pulses that occur within a predetermined time limit of each other, means for producing output pulses proportional in magnitude to the degree of overlap of the rectangular pulses derived from the two carriers, means for generating a second alternating current of a frequency depending on the frequency of said output pulses and in a predetermined phase relation with said output pulses, and means for comparing the phase relationship between said first and second alternating currents.

21. A radio receiver for use in a mobile craft comprising means for receiving a continuous train of pairs of related pulses at the same carrier frequency and of a form in which the interval between each related pair of pulses varies repetitively at a constant frequency and the first pulse of each pair being width modulated at said constant frequency, an electronic switch for separating the first pulses in each related pair into a first channel and the second pulses in each related pair into a second channel, means in said first channel and responsive to said first pulses for producing a first alternating current at said constant frequency, a delay circuit in said first channel for delaying each first pulse, pulse producing means in said first channel for deriving a rectangular pulse of a first predetermined length from each delayed first pulse, pulse producing means in said second channel for deriving a rectangular pulse of a second predetermined length from each received second pulse, said delay circuit and said first and second named pulse producing means having such constants that the rectangular pulses derived in said first channel will overlap in time with the related rectangular pulse derived in said second channel when the pairs of related pulses reach the receiver within a predetermined time of each other, means for producing output pulses proportional in magnitude to the degree of overlap of said related rectangular pulses, means for producing a second alternating current in phase with and derived from the magnitude variations of said output pulses, and indicating means for comparing the phase relationship between said first and second alternating currents.

FREDERIC CALLAND WILLIAMS.

REFERENCES CITED

The following references are of record in the file of this patent:

UNITED STATES PATENTS

| Number | Name | Date |
|---|---|---|
| 1,615,712 | Loth | Jan. 25, 1927 |
| 2,144,203 | Shanklin | Jan. 17, 1939 |
| 2,403,626 | Wolff et al. | July 9, 1946 |
| 2,408,048 | Deloraine et al. | Sept. 24, 1946 |
| 2,408,773 | Goodall | Oct. 8, 1946 |
| 2,419,525 | Alford | Apr. 29, 1947 |

FOREIGN PATENTS

| Number | Country | Date |
|---|---|---|
| 700,525 | France | Dec. 23, 1930 |
| 578,335 | France | June 30, 1924 |